United States Patent [19]

Anderson

[11] 3,755,937

[45] Sept. 4, 1973

[54] RECORD CARD AND METHOD OF INDEXING

[75] Inventor: Thomas P. Anderson, Hubbard Woods, Ill.

[73] Assignee: Microseal Corporation, Evanston, Ill.

[22] Filed: May 3, 1971

[21] Appl. No.: 139,589

[52] U.S. Cl. ...................... 40/78.15, 40/360, 40/159

[51] Int. Cl. ............................................ B42f 21/00

[58] Field of Search .................. 40/78.15, 159, 359, 40/360

[56] References Cited

UNITED STATES PATENTS

| | | | |
|---|---|---|---|
| 3,486,259 | 12/1969 | Engelstein | 40/78.15 |
| 3,504,907 | 4/1970 | Barber et al. | 40/78.15 |
| 3,238,655 | 3/1966 | Engelstein | 40/159 |
| 1,552,103 | 9/1925 | Wood | 40/78.15 |
| 1,764,580 | 6/1930 | Raviglione | 40/78.15 |

FOREIGN PATENTS OR APPLICATIONS

| | | | |
|---|---|---|---|
| 1,150,574 | 5/1956 | France | 40/78.15 |

*Primary Examiner*—Robert W. Michell
*Assistant Examiner*—J. H. Wolff
*Attorney*—Hill, Sherman, Meroni, Gross & Simpson

[57] ABSTRACT

Record cards including film jackets and/or film record cards may be readily and conveniently indexed for filing and retrieval by applying a coded pressure sensitive tape at an edge of the record card after the record card has been dated or up-dated. Advantageously the pressure sensitive tape may be applied along an edge or a portion of an edge of the card with the length and location of the tape serving an indexing function. The tape is preprinted with striping or other indicia and is color coded. Application of the tape to only a portion of the edge allows the use of the edge for additional means of indexing such as notching. In addition, the tapes may be superimposed on each other. Where the film jacket is transparent the pressure sensitive material may be a transparent material bearing printed matter which printed matter will be reproduced with the microfilm in the jacket.

2 Claims, 7 Drawing Figures

PATENTED SEP 4 1973 3,755,937

SHEET 1 OF 2

INVENTOR.
THOMAS P. ANDERSON

BY Hill, Sherman, Meroni, Gross & Simpson
ATTORNEYS

INVENTOR.
THOMAS P. ANDERSON
BY Hill, Sherman, Meroni, Gross & Simpson
ATTORNEYS

RECORD CARD AND METHOD OF INDEXING

BACKGROUND OF THE INVENTION

1. Field of the Invention

This invention generally relates to record keeping systems and more particularly concerns a method of indexing a record card and the record card itself with suitable indicia along an edge thereof. In the context of this invention the term record card includes film jackets, film record cards, punched cards, and other business cards particularly adapted for storage in a drawer.

2. Prior Art

As a step toward organizing the great proliferation of information and records of all types in a managable order and form, the transfer of the data to microfilm and computers has made a significant contribution. While these and other means have helped reduce the physical size of the information and perhaps provided more convenient storage, there has remained the problem of effectively filling and/or retrieving this matter. The key problem has centered around indexing for without an efficient means of indexing information for ready filing and retrieval the value of records is greatly diminished if not outrightly negated. This problem has been facing the industry for years, yet to my knowledge all prior art indexing systems for information cards of this type are defficient in many respects, and have not provided the necessary adaptability and flexibility.

An example of the prior art indexing is in the area of color coding of cards. Thus it is known in the prior art to provide color coding to the edges of record cards to facilitate their filing and retrieval, however, to my knowledge, these cards are always preprinted with this colored striping before the purchaser acquires the cards and hence not only is it necessary for the purchaser-user of the cards to carry a substantial inventory in order to have a sufficient number of red, blue, yellow, etc. cards but any subsequent changes in the information on the card cannot be easily and quickly indexed. Other disadvantages also are present.

With the prior art color striping extending across one edge of each card there is a necessary limitation on the number of readily recognizable colors which severely limits the breakdowns in indexing that may be achieved through this method. Moreover, the more colors used, the greater the inventory so that even if a great number of different colors were possible, the necessary inventory would reach the point of being unworkable.

Another disadvantage of the prior art is that the special color coded cards ordinarily must be special ordered thereby usually requiring extra time and also resulting in greater quantities of each colored card being ordered at one time.

An even greater disadvantage of the prior art methods of indexing cards is that the usual predetermined, permanent color coding or other indexing of the card does not provide for subsequent changes. Rather, if changes in the card information require a change in the indexing means, such as color coding, for example, a new card must be made out and the information transferred. The transfer of the information is subject to error and requires additional procedural steps and personnel. These problems exist in the prior art especially where cumulative records are kept on microfilm, as for example, in schools. In those cases where microfilm cards containing transcripts of grades and other achievements are continually being supplemented, a change in indexing usually is required from time to time. Thus, in the example, with color coded cards of the prior art each achievement of a certain level of competence or each accomplishment either was not indexable, required another card or required transfer of the old and new to a new card. These arrangements are very unsatisfactory.

SUMMARY OF THE INVENTION

These and other disadvantages of the prior art are overcome by my invention in a method of indexing record cards wherein a coded indicia, advantageously a pressure sensitive tape, is applied at or along an edge of a record card after the information has been added to the record card.

Where the card is an aperture card having an opaque indexing portion, the coded indicia may take the form of an opaque and wholly or partially colored pressure sensitive material. My invention is particularly advantageous when used with a translucent or transparent film jacket in which case the coded indicia may be a transparent pressure sensitive material with a colored stripe in an area where it will be visible and serve to index the film jacket.

The coded indicia material should be of a typable material so that typed information may be applied to the coded indicia before it is applied to the cards. Where the information is to be used with a computer I have found that having the computer means type the information on the pressure sensitive material provides excellent results. The application of the typed coded indicia may of course be effected by a machine. The typed information on the transparent card will be readily reproduced with the microfilm documents stored therein.

In a further embodiment of my invention a transparent typable indicia means such as a pressure sensitive material is applied in the transparent field of the record card. In this case the transparent material may be of a double "pocket" forming thickness as is well known in aperture cards or the transparent material may be of a single layer. In the latter case other material may not be inadvertently inserted into a pocket to cover or obscure the typed material.

It is yet another advantage that any further changes in the type of information on the record card may also be clearly indexed. Thus with a film jacket or film record card a preprinted pressure sensitive tape with various color striping may be added to a portion of the jacket or card that is visible when the card is filed.

The pressure sensitive tape may be of various lengths as well as colors so that the indicia could extend across the whole or any portion of the edge or edges usually visible when the card is stored. As set forth in the prior art example, it is possible with the invention herein that the color coding of microfilm student record cards may be varied as new information requires separate indexing. New or separate cards as required in the prior art would not be necessary. Thus, all record cards of freshmen students could be marked in a particular edge location with a particular length of coded strip having a first color, such as yellow, while the same card when up-dated with the sophomore record could be changed with a different colored, and perhaps differently positioned, piece of pressure sensitive tape to indicate that those records were now present in the card. Additional color coded tape in various combinations of length and location could be added as each year's records are included in the card. While it may be desirable to index other information such as the completion of driver education programs this information could be color coded in yet another way so that, for example, a quick visible check could be made of those sophomore students who have passed driver education and those who have not.

With the color coded strips taking up only a portion of an edge or edges on the cards, the remaining edge or edges could easily provide room for additional indexing means such as, for example, a notch or notches, to facilitate filing. With the invention there is provided in this situation the advantage that the notches may be changed or corrected by applying the pressure sensitive tape over the edge in these notch areas to obliterate or cause the notches to disappear after they had served their usefulness. Also, all or portions of a previous color could be overlaid with a tape of a different color as the information on the card changes index classifications. In yet another development the overlying tape itself has a notch in it to obliterate all but a very small portion of the underlying tape so that it would be known that in fact a change in classification has occurred and what that change was. These represent but a few examples of the applications of the principles of my invention to record cards including film jackets and film cards.

Where the coded indicia means are tapes, the tapes themselves may further be preprinted from roll stock in regular lengths based on the standard lengths of cards or jackets with which they are to be used, so that the length and/or positioning of the striping can be readily predetermined. Pressure sensitive tape of easy to identify colors which may include legibly marked indicia is contemplated by the invention herein.

From the foregoing brief summary of the invention it may be understood that I have set forth an advantageous method and article which will overcome the disadvantages of the prior art and will substantially reduce the inventory of coded cards and greatly facilitate their indexing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
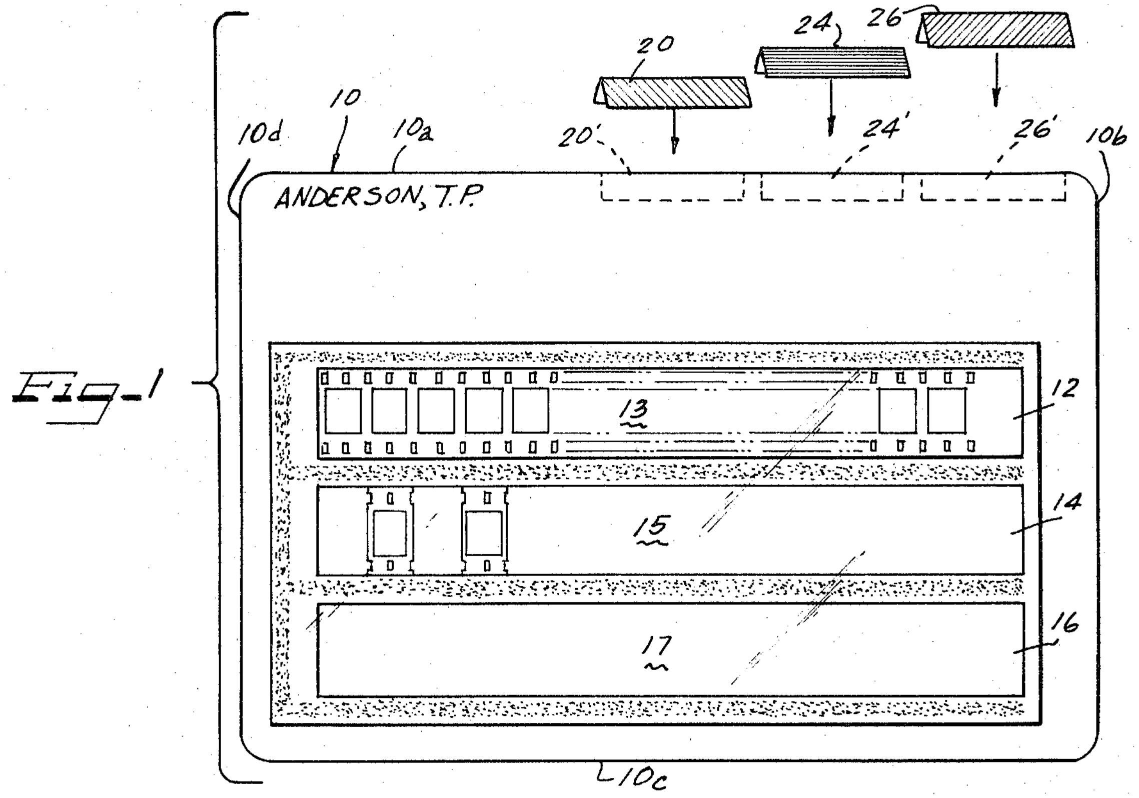
FIG. 1 is a schematic illustration of the invention herein as applied to a microfilm record card wherein the pressure sensitive tapes are added at various times in conjunction with the application of new information to the card.

Referring to FIG. 1 there may be seen a record card generally indicated at 10 having a top edge 10*a*, a first side edge 10*b*, a bottom edge 10*c* and a second side edge 10*d*. The record card 10 may be a film jacket or a record card such as shown in my U.S. Pat. No. 3,339,303, or may take the form of a punched card or other business card particularly adapted for storage in a drawer. In the example shown, the card 10 has suitable pockets 12, 14, 16 wherein strips of microfilm 13 of a size of 8, 35 16 millimeters, etc., may be received. Although a rectangular card is illustrated it will be understood that other shapes and sizes are contemplated.

Inasmuch as the microfilm 13 may reflect an accumulation of records which are changed from time to time it is likely that the indexing of the cards should be changed to reflect this new information. According to the embodiment of my invention illustrated in FIG. 1 the addition of a strip of microfilm 13 to the pocket 12 in the card 10 is suitably indicated by the provision of a coded indicia 20 to a portion of the card 10 which will be visible when it is stored in a drawer with a group of other cards. In practice I have obtained excellent results where the coded indicia is a pressure sensitive tape. FIG. 1 illustrates the piece of tape 20 in a position above the card prior to being applied by adhering the tape over the edge of the card 10 in a position indicated by the dotted lines 20'. The coded indicia or tape pieces 24, 26 are shown spaced from the card at varying distances to diagrammatically illustrate the different times at which the indicia 24, 26 may be applied to the card 10. Thus, as the microfilm strip 15 is received in the pocket 14 the indicia tape 24 would be adhered in the position indicated by the dotted lines at 24'. Similarly when the microfilm strip 17 is added to the card by insertion in the pocket 16 the coded indicia 26 could be similarly added to the top edge 10a at a position indicated at 26'.

The indicia 20, 24 and 26 may be of the same or varying lengths and widths, of different colors, of different color band widths, of different configurations, and of different physical characteristics. Thus, the coded indicia 20, 24 and 26 need not extend over the top edge 10*a* but may be adhered to one side of the card adjacent the edge. The coded indicia 20, 24, 26, generally will not protrude from the top edge 10*a* by more than their thickness.

Figure 2:
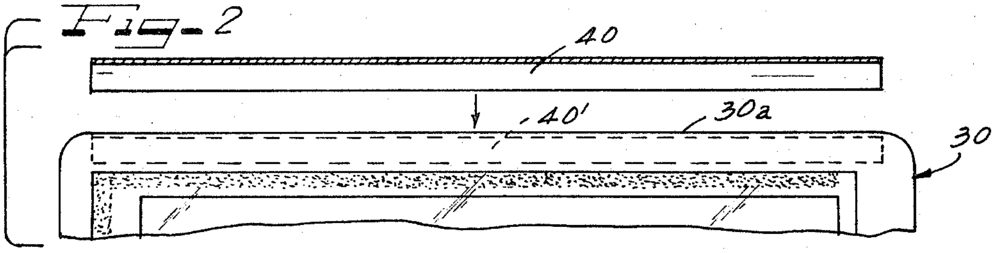
FIG. 2 is another schematic representation of the application of a length of striped coding material to an upper edge of a record card.

As shown in FIG. 2 the coded indicia 40 may extend along substantially the entire length of an edge 30*a* of the card 30. Again the indicia strip 40 is shown in solid lines in a position removed from the edge of the card and in dotted lines as it would appear in final position 40' on the card 30. This tape may include printed information such as names, addresses, etc., and may be applied before, during or after the addition of other information to the card. The addition of other information will ordinarily be followed by a change in the indexing and in such cases where the card is not translucent the opaque tape may be used to obliterate old information.

Figures 3, 4:
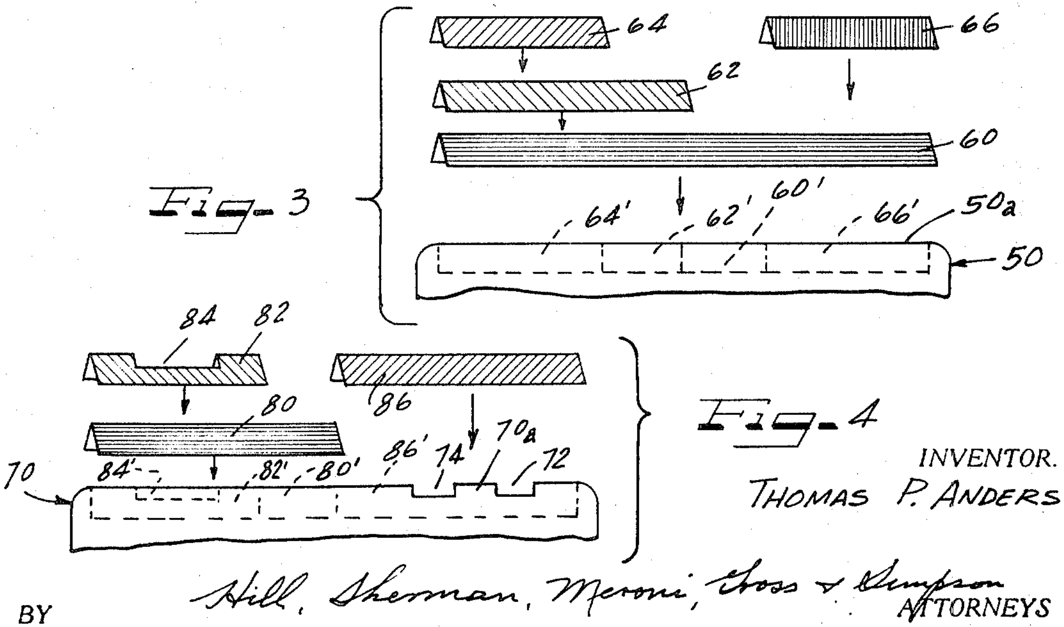
FIG. 3 is a schematic illustration of an upper edge of a record card having a long length of tape adhered over the edge of the card and smaller lengths of tape adhered over the long length of tape.
FIG. 4 is a schematic illustration of an upper edge of a record card having a length of coding tape over a portion of an edge thereof with the remainder of the edge having additional indexing means such as notches therein and showing the application of subsequent superimposed coding tape portions over the portions of the tape and the card.

An example of the changes in indexing are shown in FIG. 3 wherein a card 50 having an upper exposed edge 50*a* has initially adhered thereto a coded indicia strip 60 which extends substantially along the entire length of the edge 50*a*. As stated before this may include other printed indicia. At some later time other coded indicia means such as the pressure sensitive tapes 62, 64 and 66 may be adhered over the strip 60 to index further information added to the card 50. Because the tapes are formed of a relatively thin material the superimposition of the strips 60, 62 and 64, for example, should not appreciably affect the height of the card. That is, the addition of the additional tape pieces 62, 64 would not hide from view the edge of an adjacent card. It will be understood that the coded indicia such as illustrated at 62, 64 and 66 may be applied in a sequence of time, position, color, size and arrangement along the visible edge of the card to assume the final positions 60′, 62′, 64′ and 66′.

An example of an arrangement incorporating various other ideas of my invention is shown in FIG. 4 wherein a card 70 having an upper edge 70*a* is shown with a coded indicia means 80, 80′ along only a portion of the length of the edge 70*a* leaving the remaining portion of the edge open for the provision of additional indexing means. An example of such additional indexing means are the notches 72, 74 which have been cut in the edge of the card 70. The value of notches as a means of indexing is known in the prior art and need not be explained in further detail here. An improvement on the existing notch indexing means is set forth in my copending application Ser. No. 139,591, filed May 3, 1971, which notching system could be applied to the cards herein.

While the notches 72 and 74 are shown as having been cut directly in the upper edge 70*a* of the card 70, it is contemplated by this invention that similar notches could have been cut in the top edge of the card after the coded indicia means had been added to the edge. In other words, the notches could identify further subdivisions of the coded indicia. Also, a superimposed coded indicia such as shown at 82, 82′ may have therein a notch 84 so that as shown here, when the coded indicia means 82 is superimposed on the coded indicia 80 a portion of the coded indicia 80, 80′ will be visible through the area of the notch 84. In such manner the records may be indexed to indicate a revision, for example. While the indicia means 82, 82′ is shown as extending only along a portion of the length of the indicia 80, 80′ it will be understood that the length of the strip 82 may be equal to or longer than the strip 80.

Where indexing means such as notches 72, 74 have been provided in the card 70, the coded indicia means herein in the form of a pressure sensitive tape provide the advantage that these notches may be changes or corrected by applying the pressure sensitive tape 86, 86′ over the edge 70*a* in the notch area to obscure or obliterate the notches as might be required with a change in indexing.

While the pieces of tape are shown in the drawing as being inverted generally V-shaped strips, it will be understood that other tape configurations are also possible. It will also be understood that the invention may be equally applicable to various other edges or sides of the card depending upon the manner of storage and configuration of the card. The card itself may have suitable indicia incorporated thereon during its manufacture which indicia may aid in the placement of the coded indicia of the invention or additional indexing means.

Figures 5, 6, 7:
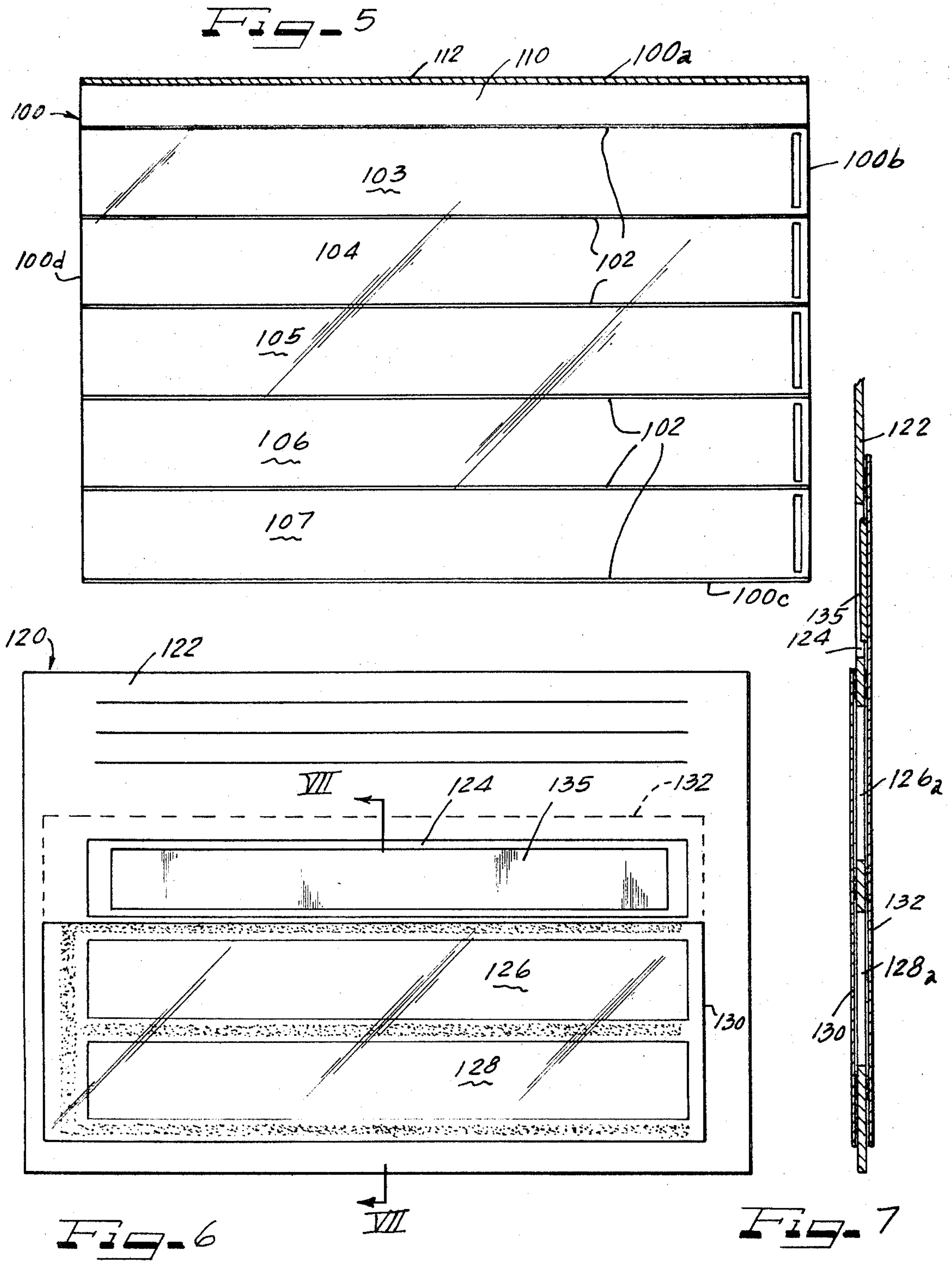
FIG. 5 illustrates a transparent film jacket having a transparent typable striped tape across the upper edge thereof.
FIG. 6 illustrates a film record card having an opaque portion surrounding a transparent portion.
FIG. 7 is a cross sectional view of FIG. 6 taken along the line VII—VII showing the single thickness portion.

Referring to FIG. 5 there may be seen a transparent film jacket generally indicated at 100 having a normally exposed indexing edge 100*a*, a side edge 100*b*, a bottom edge 100*c*, and a side edge 100*d*. A plurality of seal areas 102 separate the transparent card 100 into a plurality of pockets 103–107 which are adapted to receive microfilm therein. The transparent card 100 will be adaptable to receive microfilm of any suitable size and shape. In the embodiment of FIG. 5 the pockets 103–107 are adapted to receive microfilm of 16 millimeter size. With the microfilm in place in the pocket between the two layers of transparent material, the microfilmed matter may be reproduced directly from the film jacket without removing the individual pieces of microfilm. It will thus be understood that as the pieces of microfilm are added or substracted from the card 100 that it is important to properly index or reindex the film jacket. In the past the prior art film jackets have been precoded with a color striping along an upper edge thereof. This has meant that with as many as ten different colors of striping being used that large quantities of the relatively expensive film jackets have had to be inventoried. This is not only costly but also leads to delays where the use of a particular card cannot be predicted and it is unexpectedly used up so that additional cards have to be special ordered.

The problems of the prior art have been overcome according to my invention by the provision of a separate transparent material 110 such as pressure sensitive tape which is applied along an indexing edge 100*a* of the film jacket 100 and which has a color stripe 112 along the upper edge thereof. By this means quantities of only a single transparent card need be inventoried together with quantities of pressure sensitive tape having the various color stripes thereon. The tape 110 may be preprinted and cut from roll stock in predetermined lengths or be on convenient rolls so that the lengths may be determined and dispensed as they are needed. To differentiate various cards from one another it may be possible to segregate them by the length of the color striping 112 applied to the top of the card as heretofore suggested with respect to FIGS. 1 through 4.

It is contemplated that the material 110 applied to the card may be of a typable material so that information may be applied to the material 110 before it is applied to the jacket 100. For example, where the information is to be used with or in a computer system, I have found that having a computer controlled means type the information on the pressure sensitive transparent tape 110 guarantees information accuracy and speeds the placement of index information on the top of the jacket when the label is transferred. It is contemplated that the information would be typed on the tape material 110 before the tape is applied to the jacket. A plurality of lines of type may be included. Application of the tape may be either manual or by machine. The transparent material 110 has the advantage that the typed information may be reproduced with the microfilm in the pockets 103 through 107.

Referring to FIG. 6 there may be seen a record card generally indicated at 120 having an opaque portion 122 surrounding open areas or portions generally indicated at 124, 126 and 128 for example. According to the invention herein as shown in FIGS. 6 and 7 a plurality of pockets 126*a*, 128*a* are formed in the areas 126, 128 respectively between a first enveloping member 130 adhered to one side of the card 120, and a second enveloping member 132 (shown in dotted lines) adhered to an opposite side of the card 120. It will be seen that the second enveloping member 132 is adhered to one surface of the opaque portion 122 and completely overlies the open portions of the card indicated at 124, 126, 128. The first enveloping member 130 is adhered to the opposite side of the opaque portion 122 of the card 120 along its edges and overlies only the opening means 126, 128 to provide for the formation of pockets 126*a*, 128*a* but yet leave only the single layer 132 in the open portion 124. In the arrangement as shown, the open portion 124 which might ordinarily be a pocket will have only a single layer of transparent film 132 overlying one side thereof. In such case a typable translucent material 135 such as a pressure sensitive tape can be provided with suitable indicia, either by typing or writing, and be placed within the area 124 on the transparent material 132. When the card is placed in a duplicator, the typed or written image on the translucent pressure sensitive tape 135 will be reproduced as will the images carried on the film carried within the lowermost two film channels or pockets 126, 128.

It is also contemplated by my invention that the portion of the film 132 in the area 124 may itself be a print receiving translucent film so that one may have the option of either writing directly on the translucent film in the area 124 or of writing on a translucent pressure sensitive tape material 135 which in turn is placed on that translucent film. In the latter instance, I have found the reproducibility of the image contained on the tape to be quite satisfactory. With these arrangements a great flexibility of indexing is provided.

From the foregoing description of the invention it may be seen that I have provided a particularly advantageous solution to the problems of the prior art. Thus, according to the method of my invention a record card may be indexed for ready filing and retrieval by applying a color coded indicia means along an edge of a record card to reflect the addition or subtraction of information from a record card. With the article of my invention a system of indexing cards such as those containing microfilm, is readily adaptable to be indexed to reflect changes in the information carried by those cards.

Although minor modifications might be suggested by those versed in the art, it should be understood that I wish to embody within the scope of the patent warranted hereon all such modifications as reasonably and properly come within the scope of my contribution to the art.

I claim:

1. A record card indexed for ready filing and retrieving comprising:

a rectangular card for storing a plurality of data thereon and having at least one visible marginal edge;

said edge having at least one pressure-sensitive tape segment juxtapositioned thereover and of a distinct color in accordance with a first set of data stored on said card, said tape segment being of a given length in accordance with a second set of data stored on said card, said tape segment being positioned at a select location along said edge in accordance with a third set of data stored on said card;

said edge having at least another pressure-sensitive tape segment of another distinct color in accordance with a fourth set of data stored on said card, said another tape segment being superimposed over at least a portion of said one tape segment whereby a portion of both tape segments are visible to indicate a revision of data stored on said card while allowing the presence of original data on said card to remain visible.

2. A record card as defined in claim 1 wherein said another tape segment has at least one notch located on a portion thereof and said portion thereof having said notch is superimposed on a portion of said one tape segment with said notch juxtaposed on said edge of said card whereby a portion of said one tape segment is visible through said notch to indicate a revision of data stored on said card while allowing the presence of original data on said card to remain visible.

* * * * *